United States Patent
Matsumoto et al.

(10) Patent No.: US 9,400,929 B2
(45) Date of Patent: Jul. 26, 2016

(54) OBJECT DETECTION DEVICE AND METHOD FOR DETECTING AN OBJECT BY PERFORMING A RASTER SCAN ON A SCAN WINDOW

(71) Applicant: PANASONIC CORPORATION, Osaka (JP)

(72) Inventors: Yuichi Matsumoto, Kanagawa (JP); Megumi Nagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 98 days.

(21) Appl. No.: 14/381,657

(22) PCT Filed: Mar. 5, 2013

(86) PCT No.: PCT/JP2013/001367
§ 371 (c)(1),
(2) Date: Aug. 28, 2014

(87) PCT Pub. No.: WO2013/132836
PCT Pub. Date: Sep. 12, 2013

(65) Prior Publication Data
US 2015/0016684 A1    Jan. 15, 2015

(30) Foreign Application Priority Data

Mar. 5, 2012   (JP) ................. 2012-048272

(51) Int. Cl.
*G06K 9/00* (2006.01)
*G06T 7/00* (2006.01)
(Continued)

(52) U.S. Cl.
CPC .......... *G06K 9/00624* (2013.01); *G06K 9/3233* (2013.01); *G06T 7/0042* (2013.01);
(Continued)

(58) Field of Classification Search
None
See application file for complete search history.

(56) References Cited

U.S. PATENT DOCUMENTS

2003/0007702 A1* 1/2003 Aoyama ................ G06T 3/403
382/300
2005/0111739 A1* 5/2005 Ida .................... G06F 17/30259
382/199

(Continued)

FOREIGN PATENT DOCUMENTS

JP   2006-146626      6/2006
JP   2006146626 A  *  6/2006

(Continued)

OTHER PUBLICATIONS

U.S. Appl. No. 14/496,055 to Yuichi Matsumoto et al., which was filed on Sep. 25, 2014.

(Continued)

*Primary Examiner* — Wenpeng Chen
(74) *Attorney, Agent, or Firm* — Greenblum & Bernstein, P.L.C.

(57) ABSTRACT

An object detection device includes a raster scan execution unit that executes a raster scan on an input image using a scan window in order to detect an object within the input image which is input by an image input unit, a scan point acquisition unit that acquires scan points of the scan window which are positions on the input image during the execution of the raster scan, and a size-changing unit that changes a relative size of the input image with respect to the scan window. When the relative size is changed by the size-changing unit, an offset is given to the starting positions of the scan points after the change with respect to the starting positions of the scan points before the change.

12 Claims, 21 Drawing Sheets

(51) Int. Cl.
*G06K 9/32* (2006.01)
*G06K 9/22* (2006.01)

(52) U.S. Cl.
CPC . *G06K2009/226* (2013.01); *G06T 2207/20016* (2013.01); *G06T 2207/30196* (2013.01); *G06T 2207/30232* (2013.01); *G06T 2207/30261* (2013.01)

(56) References Cited

U.S. PATENT DOCUMENTS

| | | | | |
|---|---|---|---|---|
| 2005/0213810 A1* | 9/2005 | Sabe | G06K 9/00248 | 382/159 |
| 2005/0220336 A1* | 10/2005 | Sabe | G06K 9/00248 | 382/159 |
| 2006/0110029 A1* | 5/2006 | Kazui | G06K 9/00228 | 382/159 |
| 2006/0222262 A1* | 10/2006 | Ueda | G06K 9/036 | 382/280 |
| 2007/0133878 A1* | 6/2007 | Porikli | G06K 9/4642 | 382/190 |
| 2007/0217688 A1* | 9/2007 | Sabe | G06K 9/00228 | 382/226 |
| 2009/0175496 A1* | 7/2009 | Kondo | G06K 9/32 | 382/103 |
| 2009/0231628 A1* | 9/2009 | Matsuhira | G06K 9/00228 | 358/1.18 |
| 2010/0226532 A1* | 9/2010 | Hayasaka | G06K 9/6203 | 382/103 |
| 2011/0299783 A1* | 12/2011 | Chotard | G06K 9/6257 | 382/195 |
| 2012/0294538 A1* | 11/2012 | Yamada | G06K 9/6203 | 382/218 |
| 2013/0027561 A1 | 1/2013 | Lee et al. | | |
| 2013/0030875 A1 | 1/2013 | Lee et al. | | |
| 2013/0089258 A1* | 4/2013 | Herling | G06K 9/00771 | 382/173 |
| 2013/0278774 A1 | 10/2013 | Fujimatsu et al. | | |
| 2014/0104313 A1 | 4/2014 | Matsumoto | | |
| 2014/0341472 A1 | 11/2014 | Fujimatsu et al. | | |

FOREIGN PATENT DOCUMENTS

| | | |
|---|---|---|
| JP | 2007-188269 | 7/2007 |
| JP | 2009-087253 | 4/2009 |
| JP | 2010-028370 | 2/2010 |

OTHER PUBLICATIONS

Search report from PCT/JP2013/001367, mail date is May 14, 2013.

* cited by examiner

FIG.12
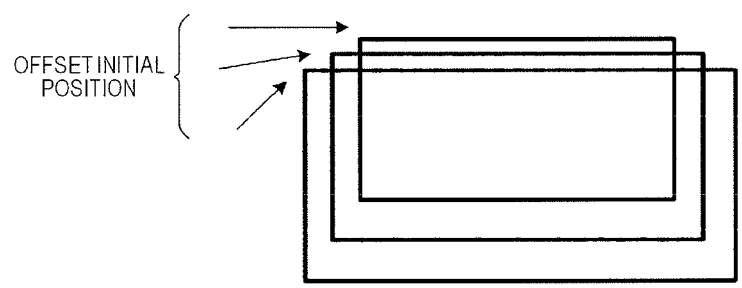
(a)
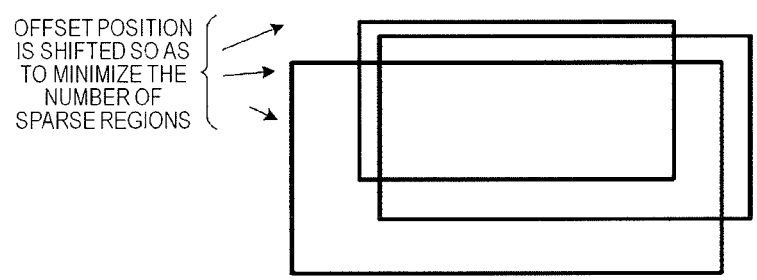
(b)

FIG.15
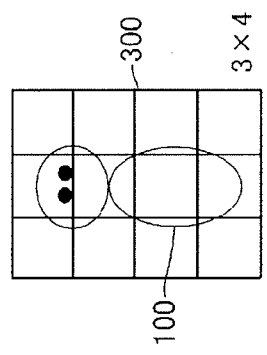
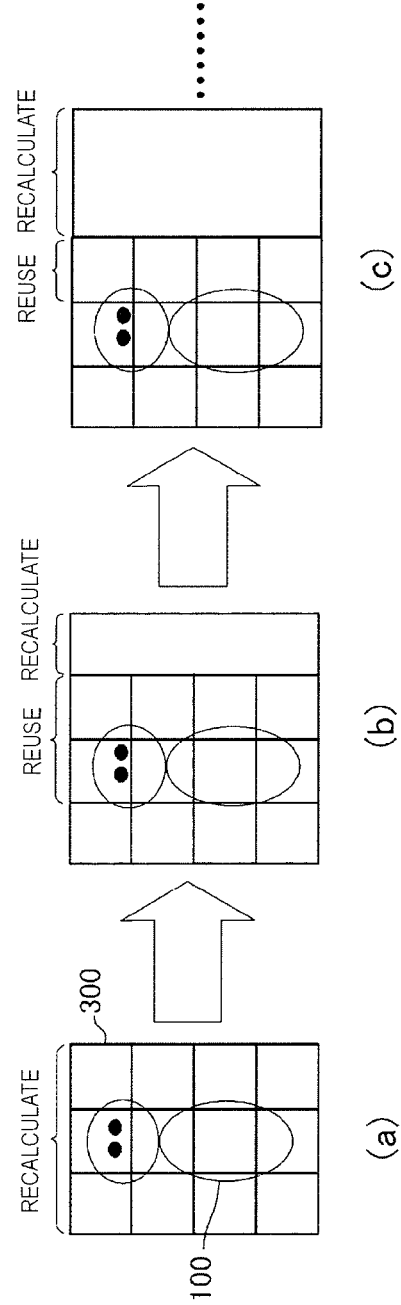

FIG.16
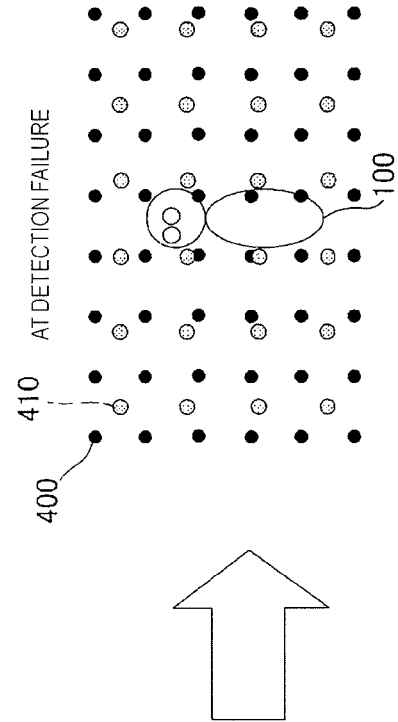
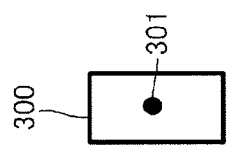
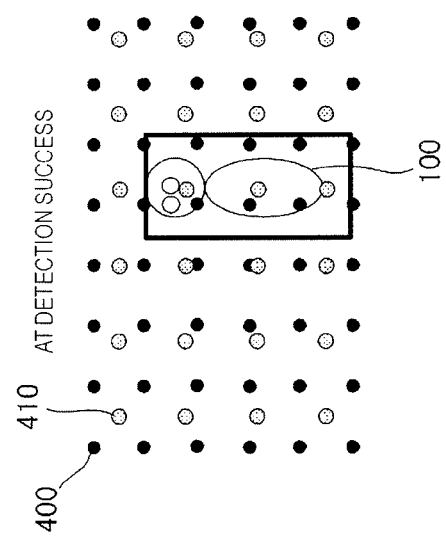

OBJECT DETECTION DEVICE AND METHOD FOR DETECTING AN OBJECT BY PERFORMING A RASTER SCAN ON A SCAN WINDOW

TECHNICAL FIELD

The present invention relates to an object detection device, an object detection method, and an object detection program that detect an object, such as a person, which is shown in an input image using a raster scan.

BACKGROUND ART

Objects having different sizes can be detected by performing a raster scan on an image obtained by image capturing using a camera, while repeating an image reduction process. FIG. 14 is a schematic diagram showing an object detection process using a raster scan. In FIG. 14, for example, a feature extraction and detection process is repeatedly performed while performing a raster scan on an image 200 in which a person 100 is shown as a detection object, using a scan window 300 having a fixed size. When the raster scan is performed on the image 200 using the scan window 300, an image reduction process can be performed, and thus it is possible to reduce the relative size of the person 100 with respect to the size of the scan window 300. As a result of this process, it is possible to detect objects having different scales (for example, a large person and a small person shown in the image).

One of object detection methods using a raster scan has been a method of extracting a feature value for each local region within a scan window. FIGS. 15(a) to 15(c) are diagrams showing an example of a feature value calculation process using the scan window 300 which is divided into 3×4 local regions. Meanwhile, in these diagrams, it is assumed that (x, y) is x, y coordinates in an input image, S is a scan step, and vertical and horizontal lengths of one local region are S. In this case, first, as shown in (a), a feature value is calculated with respect to all local regions of the scan window 300 at the position of (x, y)=(A, B). Subsequently, as shown in (b), the scan window 300 is advanced by one step in an x direction, and a feature value is calculated for new local regions (four local regions for one vertical row equivalent to the right end within the scan window 300) in the scan window 300 at the position of (x, y)=(A+S, B). With respect to a feature value for the remaining local regions (eight local regions for two vertical rows equivalent to the left end and the center within the scan window 300) of the scan window 300, the feature value calculated one step before can be reused. Similarly, as shown in (c), the scan window 300 is advanced again by one step in the x direction, and only feature values for new local regions in the scan window 300 at the position of (x, y)=(A+2S, B) is calculated. In addition, with respect to feature values for the remaining local regions, the feature value calculated one step before is reused. The above-described process is performed by advancing one step at a time. It is not necessary to recalculate the feature values for the local regions which are calculated one step before by making the scan step conform to the size of the local region, and thus it is possible to reduce the amount of processing in the calculation of the feature value for each step.

Meanwhile, a method of detecting a moving object from a captured image includes an on-image moving object measurement point determination method disclosed in Patent Literature 1. In the on-image moving object measurement point determination method disclosed in Patent Literature 1, an on-image moving object tracking method includes dividing each of time-series images stored in a storage into a plurality of blocks, and identifying a moving object included in a frame image at time t2 in units of blocks and obtaining a motion vector of the moving object in units of blocks on the basis of a correlation between a frame image at time t1 and the frame image at the time t2 and identification results of a moving object included in the frame image at the time t1. The on-image moving object tracking method has a step of (b) obtaining a geometrical centroid of a region of a moving object as an initial representative point, and (c) obtaining a trajectory of the representative point of the region of the moving object by sequentially and cumulatively adding a representative motion vector of the region of the moving object, which are obtained for each of the subsequent frame images, to the initial representative point.

CITATION LIST

Patent Literature

Patent Literature 1: JP-A-2007-188269

SUMMARY OF INVENTION

Technical Problem

However, in the above-described object detection process using a raster scan, the raster scan is performed while repeating an image reduction process in order to detect objects having different scales. However, when a process of reducing an input image is repeated, a relative scan rate with respect to the original input image becomes larger, and thus a region having a sparse scan is generated, which results in a problem of the degradation of object detection accuracy.

FIGS. 16(a) and 16(b) are diagrams showing an example of cases of object detection success and object detection failure, and an object to be detected is assumed to be a person 100. FIG. 16(a) shows an example of the case of object detection success, and FIG. 16(b) shows an example of the case of object detection failure. In addition, a black circle shown in FIGS. 16(a) and 16(b) indicates a scan point position 400 of i-th resizing, and a gray circle indicates a scan point position 410 of i+1-th resizing. The term "scan point" as used herein refers to a center position 301 of the scan window 300. The scan window always has a fixed size. As shown in FIG. 16(a), when the person 100 is located at a position having the scan points, in spite of an increase in size of a region having a sparse scan, the person 100 can be detected. However, as shown in FIG. 16(b), when the person 100 is located at a region having sparse scan points, it becomes difficult to perform the detection. That is, there is the possibility of the person 100 not being detected even with a small change in the position of the person 100. Thus, when a region having a sparse scan may be generated, this may result in the degradation of object detection accuracy.

Meanwhile, in the on-image moving object measurement point determination method disclosed in Patent Literature 1, a change in the size of an object and a motion vector are considered. However, when an object is actually detected on an image, a pixel on the image is not considered. For this reason, when the positions of frames to be detected overlap each other due to a calculation error and the like, the object cannot be detected.

The present invention is contrived in view of such situations, and an object thereof is to provide an object detection device, an object detection method, and an object detection program which are capable of suppressing the degradation of object detection accuracy in spite of a repetitive image reduction process.

Solution to Problem

An object detection device according to an aspect of the present invention includes: image input means for inputting an image; raster scan execution means for executing a raster scan on the input image which is input by the image input means using a scan window in order to detect an object of the input image within the scan window; scan point acquisition means for acquiring scan points of the scan window which are positions on the input image during the execution of the raster scan; and size-changing means for changing a relative size of the input image with respect to the scan window, wherein when the relative size is changed by the size-changing means, the scan points after the change are set so that positional relationships between the scan points before the change and the scan points after the change are distributed.

According to the above-described configuration, when the relative size of the input image with respect to the scan window is changed, the scan points after the change are set so that positional relationships between the scan points before the change and the scan points after the change are distributed (that is, separated from each other). Accordingly, it is possible to reduce the number of regions having sparse scan points and to suppress the degradation of object detection accuracy.

In the above-described configuration, a density of each of the scan points and a distance of each of the scan points after the change to the scan point before the change which is present in a vicinity of each of the scan points after the change are obtained for each of the scan points after the change, and an offset is given to starting positions of the scan points after the change with respect to starting positions of the scan points before the change so that a sum of the distances is larger and a sum of the densities is smaller.

According to the above-described configuration, whenever the size of the input image is changed, an offset is given to the starting positions of the scan points after the change with respect to the entirety of the input image. Accordingly, it is possible to reduce the number of regions having sparse scan points in the entire input image and to suppress the degradation of object detection accuracy in the entire region of the input image.

In the above-described configuration, the device includes detection target region setting means for setting a detection target region including an object to be detected in the input image, wherein when the sum of the distances and the sum of the densities are obtained, the density of each of the scan points after the change, which are included in the detection target region, and the distance of each of the scan points after the change to the scan point before the change which is present in the vicinity of each of the scan points after the change are obtained for each of the scan points after the change.

According to the above-described configuration, an offset is given to the starting positions of the scan points for the detection target region which is set in the input image. Accordingly, it is possible to reduce the number of regions having sparse scan points in the detection target region and to suppress the degradation of object detection accuracy in the detection target region. Meanwhile, an offset is given to the starting positions of the scan points with respect to the entire region of the input image, and thus the object detection accuracy for the entire input image is improved. However, when seen in smaller regions, regions in which object detection accuracy is improved and regions in which object detection accuracy is degraded are generated. The detection target region is set, and thus it is possible to optimize the regions having sparse scan points only with respect to the detection target region.

In the above-described configuration, a size of the object based on a position of the object included in the input image is estimated, and the size-changing means changes, when dividing the input image into partial regions, a size of the partial region in accordance with the size of the object to change the relative size thereof, the sum of the distances and the sum of the densities are obtained for each of the scan points included in the partial region, and when the sum of the distances and the sum of the densities are obtained, the density of each of the scan points after the change and the distance of each of the scan points after the change, which are included in the partial region, to the scan point before the change which is present in the vicinity of each of the scan points after the change are obtained for each of the scan points after the change.

According to the above-described configuration, the input image is divided into partial regions in accordance with the size of the object included in the input image, and an offset is given to the starting positions of the scan points with respect to the partial regions obtained by the division. Accordingly, it is possible to reduce the number of regions having sparse scan points in the partial region and to suppress the degradation of object detection accuracy in the partial region.

An object detection method according to an aspect of the present invention includes: an image input step of inputting an image; a raster scan execution step of executing a raster scan on an input image which is input in the image input step using a scan window in order to detect an object of the input image within the scan window; a scan point acquisition step of acquiring scan points of the scan window which are positions on the input image during the execution of the raster scan; and a size-changing step of changing a relative size of the input image with respect to the scan window, wherein when the relative size is changed in the size-changing step, the scan points after the change are set so that positional relationships between the scan points before the change and the scan points after the change are distributed.

An object detection program according to an aspect of the present invention causes a computer to execute: an image input step of inputting an image; a raster scan execution step of executing a raster scan on an input image which is input in the image input step using a scan window in order to detect an object of the input image within the scan window; a scan point acquisition step of acquiring scan points of the scan window which are positions on the input image during the execution of the raster scan; and a size-changing step of changing a relative size of the input image with respect to the scan window, wherein when the relative size is changed by the size-changing step, the scan points after the change are set so that positional relationships between the scan points before the change and the scan points after the change are distributed.

An object detection device according to an aspect of the present invention includes: image input means for inputting an image; raster scan execution means for executing a raster scan on the input image which is input by the image input means using a scan window in order to detect an object of the input image within the scan window; scan point acquisition means for acquiring scan points of the scan window which are positions on the input image during the execution of the raster scan; and size-changing means for changing a relative size of the input image with respect to the scan window; and output means for outputting the input image and a scan area where the raster scan is executed, to external display means, wherein when the relative size is changed by the size-changing means, the scan points after the change are set so that positional relationships between the scan points before the change and the scan points after the change are distributed, and wherein the display means displays the scan area before the change and the scan area after the change.

According to the above-described configuration, the input image and the scan area are output to the external display means. Accordingly, it is possible to visually confirm a state where the scan area is shifted or the scan points are distributed, on a monitor screen or the like, thereby allowing an improvement in operability to be achieved.

An object detection device according to an aspect of the present invention includes: image input means for inputting an image; object detection means for detecting an object by performing a raster scan on a plurality of scan windows, for detecting the object from the image, on the image for each reduction ratio; and scan point input means for inputting the reduction ratio used when the raster scan of the scan window is performed and scan points of the scan window on the image for each reduction ratio, wherein the scan points of the scan window which are input by the scan point input means are distributed on the image.

According to the above-described configuration, it is possible to input reduction ratios and scan points for each reduction ratio from the outside, and thus it is possible to achieve a reduction in time spent on the detection of an object and an improvement in object detection accuracy.

In the above-described configuration, a sum of distances between the scan points of the scan window having different reduction ratios is set to be larger.

According to the above-described configuration, it is possible to reduce the number of regions having sparse scan points in the entire input image and to suppress the degradation of object detection accuracy in the entire region of the input image.

In the above-described configuration, the scan point input means acquires the reduction ratios and scan points for each reduction ratio through a network.

According to the above-described configuration, it is possible to input reduction ratios and scan points for each reduction ratio from the outside through a network, and thus it is possible to achieve a reduction in time spent on the detection of an object.

Advantageous Effects of Invention

According to the present invention, it is possible to suppress the degradation of object detection accuracy in spite of a repetitive image reduction process.

BRIEF DESCRIPTION OF DRAWINGS

In FIG. 12, (a) and (b) are diagrams showing an example of an offset initial position and an example in which an offset position is shifted, in the object detection device of FIG. 10.

In FIG. 15, (a) to (c) are diagrams showing an example of a feature value calculation process using a scan window which is divided into 3×4 local regions.

In FIG. 16, (a) and (b) are diagrams showing examples of cases of object detection success and object detection failure, respectively.

DESCRIPTION OF EMBODIMENTS

Hereinafter, preferred embodiments of the present invention will be described in detail with reference to the accompanying drawings.

(First Embodiment)

Figure 1:
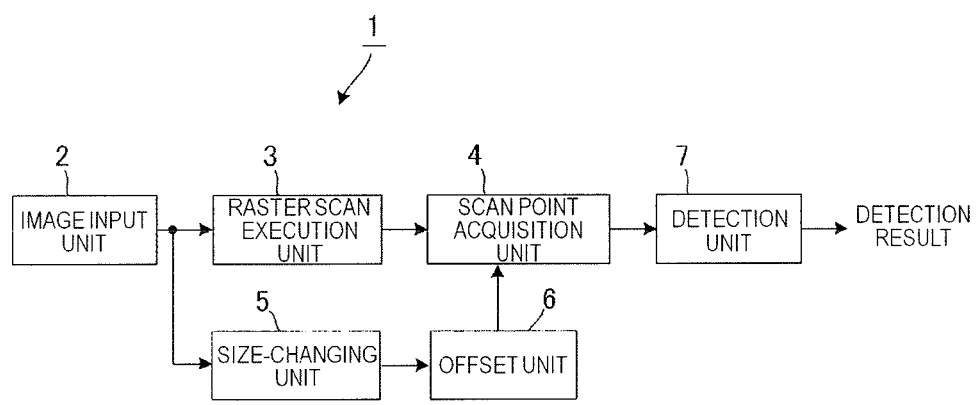
FIG. 1 is a block diagram showing a schematic configuration of an object detection device according to a first embodiment of the present invention.

FIG. 1 is a block diagram showing a schematic configuration of an object detection device according to a first embodiment of the present invention. In FIG. 1, an object detection device 1 according to this embodiment includes an image input unit 2, a raster scan execution unit 3, a scan point acquisition unit 4, a size-changing unit 5, an offset unit 6, and a detection unit 7.

The image input unit 2 inputs an image which is captured by, for example, a camera. The raster scan execution unit 3 executes a raster scan on an input image using a scan window in order to detect an object within the input image which is input by the image input unit 2. The scan point acquisition unit 4 acquires scan points of the scan window which are positions on the input image during the execution of the raster scan. The size-changing unit 5 reduces the size of the input image in order to change the relative size of the input image with respect to the scan window. Hereinafter, the reduced input image will be referred to as a "resized image".

Figure 2:
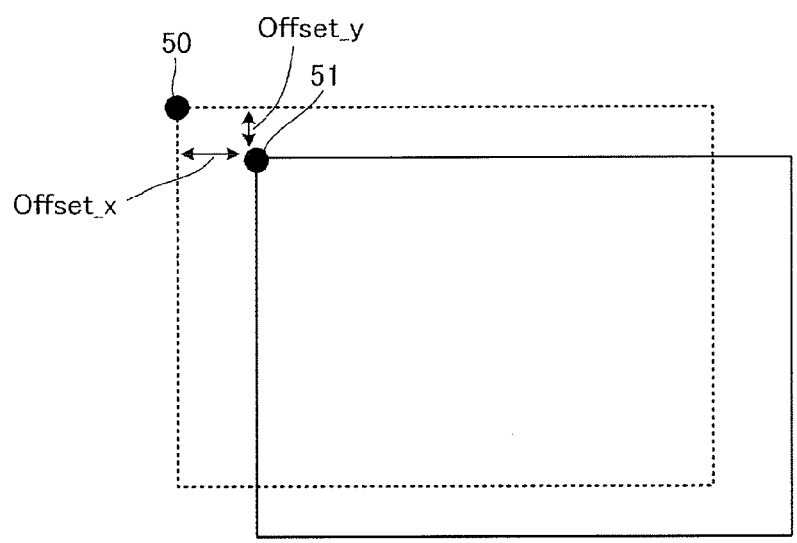
FIG. 2 is a diagram showing a starting position of an original scan point and a starting position of a scan point to which offsets (Offset_x, Offset_y) are given, in the object detection device of FIG. 1.

When the relative size of the input image is changed by the size-changing unit 5, the offset unit 6 gives an offset to starting positions of the scan points after the change with respect to starting positions of the scan points before the change so that positional relationships between the scan points before the change and the scan points after the change are distributed (separated from each other). That is, an offset is given to the starting positions of the scan points in each resized image so that the scan point positions in each resized image do not overlap each other as much as possible (so that the number of regions having sparse scan points is minimized). FIG. 2 is a diagram showing a starting position of an original scan point and a starting position of a scan point to which offsets (Offset_x, Offset_y) are given. In FIG. 2, reference numeral 50 is the starting position of the original scan point. In addition, reference numeral 51 is the starting position of the scan point to which the offsets (Offset_x, Offset_y) are given.

The detection unit 7 detects an object (for example, a person, a car, a bike, or the like) which is included in an input image, and outputs the result thereof.

Here, a method of searching for an offset value used in the offset unit 6 will be described.

An offset value for maximizing or minimizing "evaluation values", such as densities and distances between scan points of input images to be reduced, is searched for. Herein, examples of two evaluation values (1) and (2) are given.

Evaluation Value (1)

Figure 3:
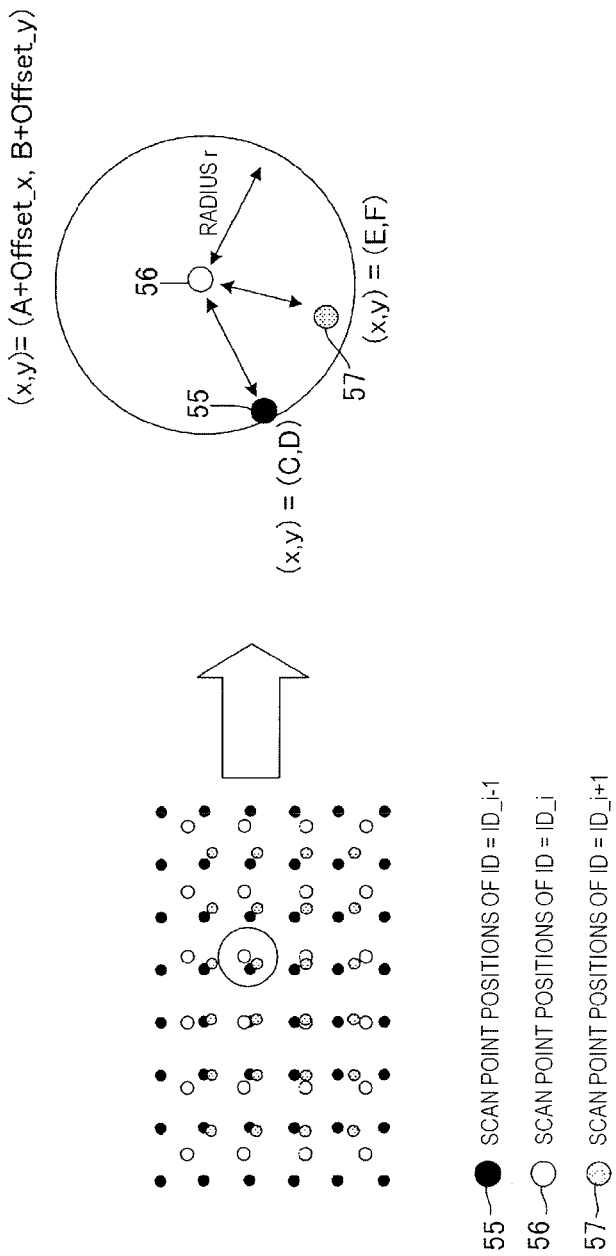
FIG. 3 is a diagram schematically showing a method of obtaining an evaluation value (1) in a method of searching for an offset value used in an offset unit of the object detection device of FIG. 1.

FIG. 3 is a diagram schematically showing a method of obtaining the evaluation value (1) in a method of searching for an offset value used in the offset unit 6. In FIG. 3, a "black circle" shown by reference numeral 55 is a scan point position of a resized image (ID_i−1). In addition, a "white circle" shown by reference numeral 56 is a scan point position of a resized image (ID_i). In addition, a "hatched circle" shown by reference numeral 57 is a scan point position of a resized image (ID_i+1). Meanwhile, i is an integer, and a resized image is formed by reducing an input image in the order of ID_i−1, ID_i, and ID_i+1.

The sum of squares of distances between the scan points located in the vicinity of the resized image ((ID_i±1)-th resized image) around ID_i is set to the evaluation value (1).
1. Offsets (x=Offset_x, y=Offset_y) are added to all scan points of a certain resized image (ID=ID_i).
2. The sum of squares of distances between scan points within a predetermined vicinity region (for example, assumed to be within a pixel having a radius of r) in the other resized images (ID=ID_i−1 and ID=ID_i+1 which are (ID_i±1)-th resized images) is calculated with respect to each of all the scan points of ID=ID_i, and the calculated value is set to an evaluation value.

For example, an evaluation value_AB (1) of a scan point located at a position of (x, y)=(A+Offset_x, B+Offset_y) is obtained by the following expression.

$$\text{Evaluation Value}\_AB(1) = (A+\text{Offset}\_x - C)^2 + (B+\text{Offset}\_y - D)^2 + (A+\text{Offset}\_x - E)^2 + (B+\text{Offset}\_y - F)^2$$

Similarly to the evaluation value_AB (1), evaluation values at all scan points in the resized image of ID=ID_i are calculated, and the sum thereof is set to a final evaluation value (1). The evaluation value (1) shows that as the value increases, positional relationships between scan points of resized images become more distributed (separated from each other).

Evaluation Value (2)

Figure 4:
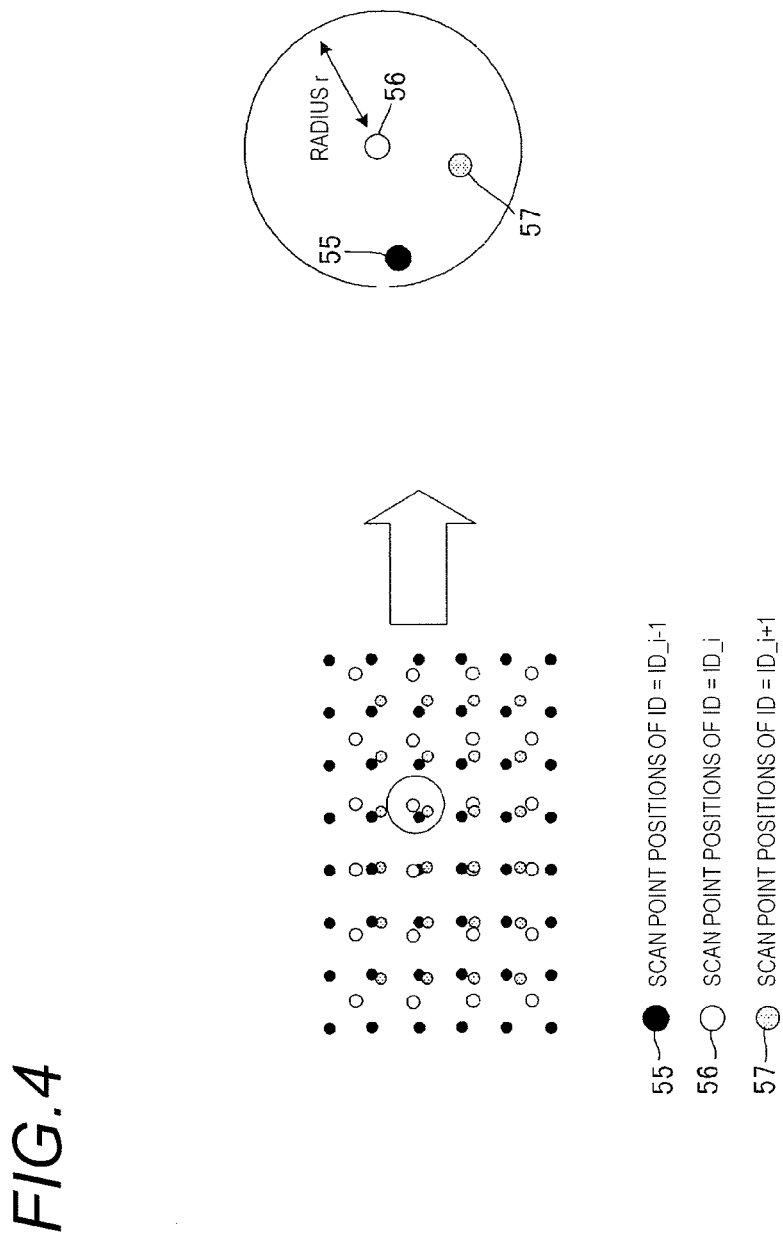
FIG. 4 is a diagram schematically showing a method of obtaining an evaluation value (2) in the method of searching for an offset value used in the offset unit of the object detection device of FIG. 1.

FIG. 4 is a diagram schematically showing a method of obtaining an evaluation value (2) in the method of searching for an offset value used in the offset unit 6. In FIG. 4, the scan point position 55 shown by a "black circle", the scan point position 56 shown by a "white circle", and the scan point position 57 shown by a "hatched circle" are similar to those as described above.

The number of scan points located in a vicinity region (for example, assumed to be within a pixel having a radius of r) of a resized image ((ID_i±1)-th resized image) around ID_i is set to the evaluation value (2).
1. Offsets (x=Offset_x, y=Offset_y) are added to all scan points of a certain resized image (ID=ID_i).
2. The number of scan points located within a predetermined vicinity region (for example, assumed to be within a pixel having a radius of r) in the other resized images (ID=ID_i−1 and ID=ID_i+1 which are (ID_i±1)-th resized images) is calculated with respect to each of all the scan points of ID=ID_i, and the calculated number is set to an evaluation value.

An evaluation value_AB (2) of a scan point located at a position of (x, y)=(A+Offset_x, B+Offset_y) is set to "2".

Similarly to the evaluation value_AB (2), evaluation values at all scan points in the resized image of ID=ID_i are calculated, and the sum thereof is set to a final evaluation value (2). The evaluation value (2) shows that as the value decreases, positional relationships of scan points of resized images become more distributed (separated from each other). That is, this is because regions having sparse scan points are not likely to be generated in a case where scan points are distributed, rather than a case where scan points are collected together in one vicinity A combination of Offset_x and Offset_y in which the evaluation value (1) is larger and the evaluation value (2) is smaller is searched for, while incrementing or decrementing by one each of the values of Offset_x and Offset_y at a time. The offset search process is as follows.
1. With respect to the resized image ID=ID_i,
2. An offset position search is performed.
2-1. The values of Offset_x and Offset_y are incremented and decremented, and a full search is performed.
2-2. The values of Offset_x and Offset_y when the evaluation value (1) is maximized and the evaluation value (2) is minimized are held as offset values of ID_i.
3. i is incremented, and the process returns to "1" described above.

Meanwhile, in addition to the evaluation values (1) and (2) described above, the evaluation value is not limited to the evaluation values (1) and (2), and may be, for example, the total number of scan points on a resized image (the number of scan points is lower due to scan point positions protruding from above an input image due to offsets being added, which may result in the degradation of object detection accuracy). In addition, an optimum method of searching for Offset_x and Offset_y is not limited to the above-described full search. For example, a method may be used of performing weighting on each of the evaluation values and adopting offset values when the sum thereof is maximized or minimized.

Figure 5:
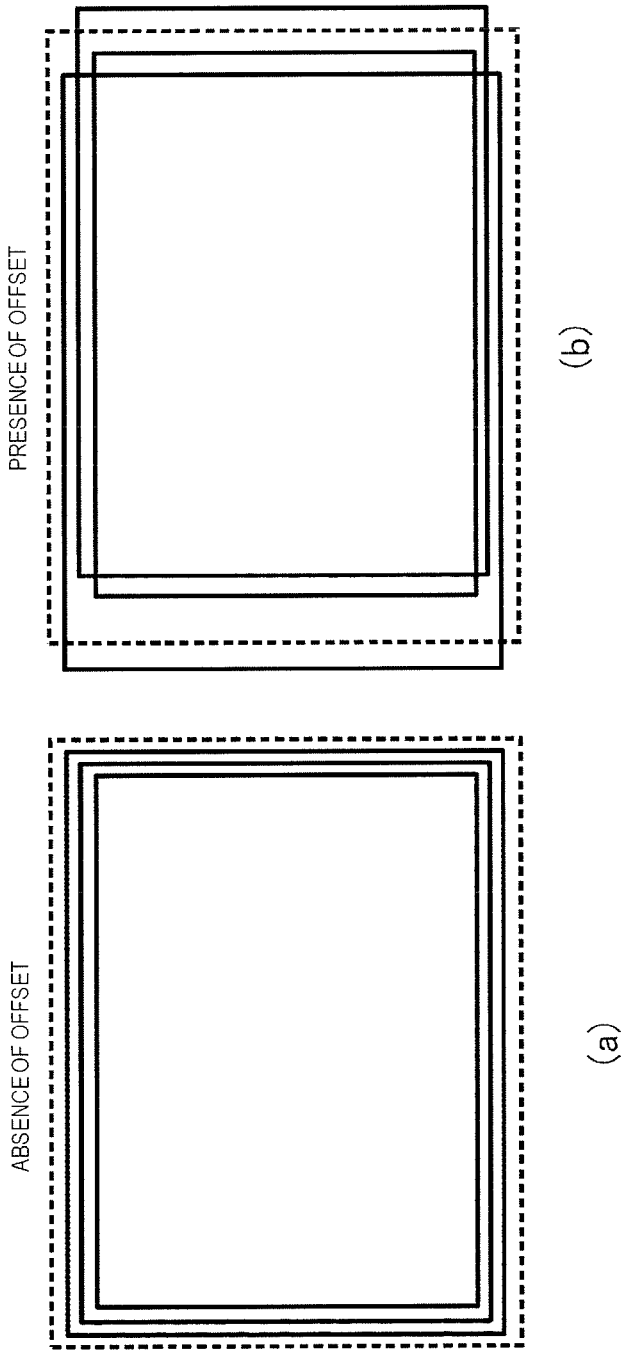
In FIG. 5, (a) and (b) are diagrams showing a resized image when a reduction process is repeated with exclusion of an offset and a resized image when a reduction process is repeated with an offset being excluded, in the object detection device of FIG. 1.

FIGS. 5(*a*) and 5(*b*) are diagrams showing a resized image when a reduction process is repeated with exclusion of an offset and a resized image when a reduction process is repeated with inclusion of an offset. (a) shows a case of the absence of an offset, and (b) shows a case of the presence of an offset. In the case of the absence of an offset as shown in (a), starting positions of scan points of resized images are fixed. On the other hand, in the case of the presence of an offset as shown in (b), starting positions of scan points of resized images are distributed.

Figure 6:
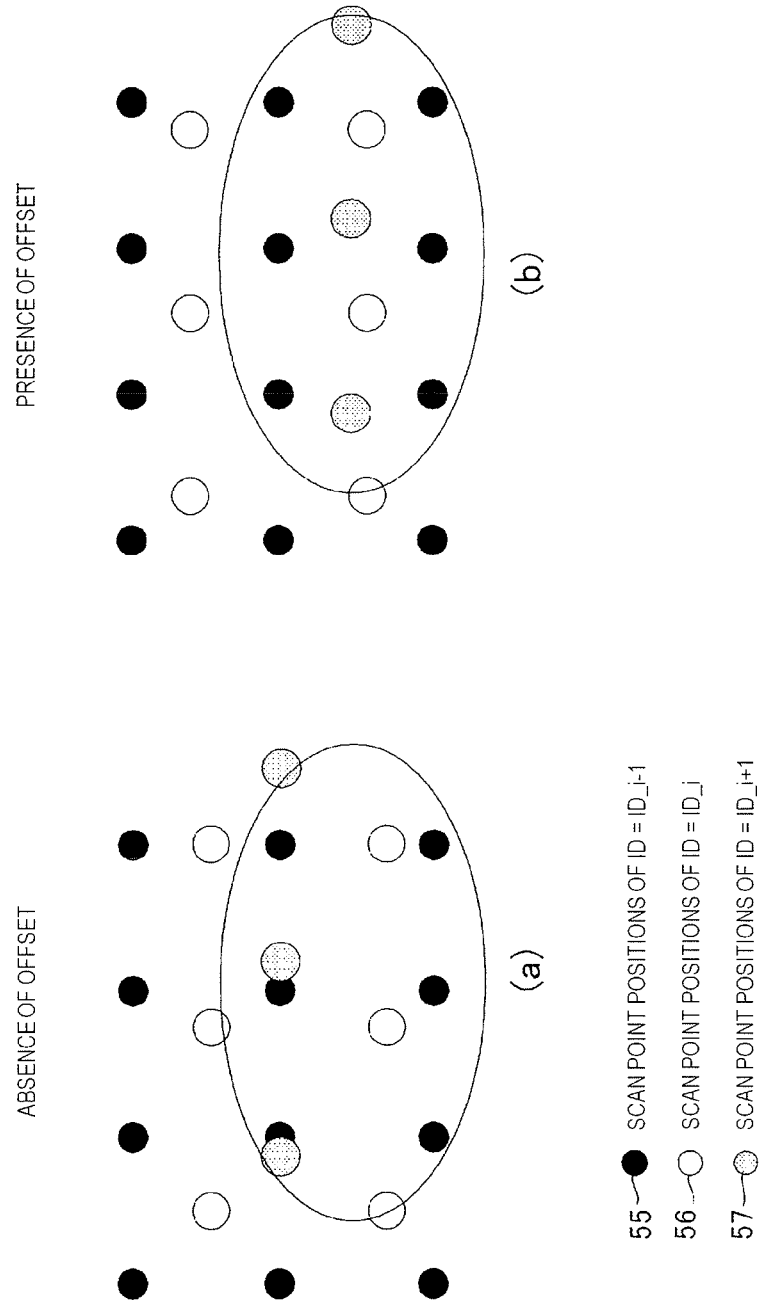
In FIG. 6, (a) and (b) are partially enlarged diagrams of FIG. 5.

FIGS. 6(a) and 6(b) are partially enlarged diagrams of FIGS. 5(a) and 5(b), respectively. (a) shows a case of the absence of an offset, and (b) shows a case of the presence of an offset. As shown in (a), in the case of the absence of an offset, a region having a high density due to a short distance between scan points is present. That is, a region where the positions of the scan points are sparse may be generated. On the other hand, as shown in (b), in the case of the presence of an offset, a distance between the scan points is long, and thus the density is low. That is, a region where the positions of the scan points are sparse is reduced.

Figure 7:
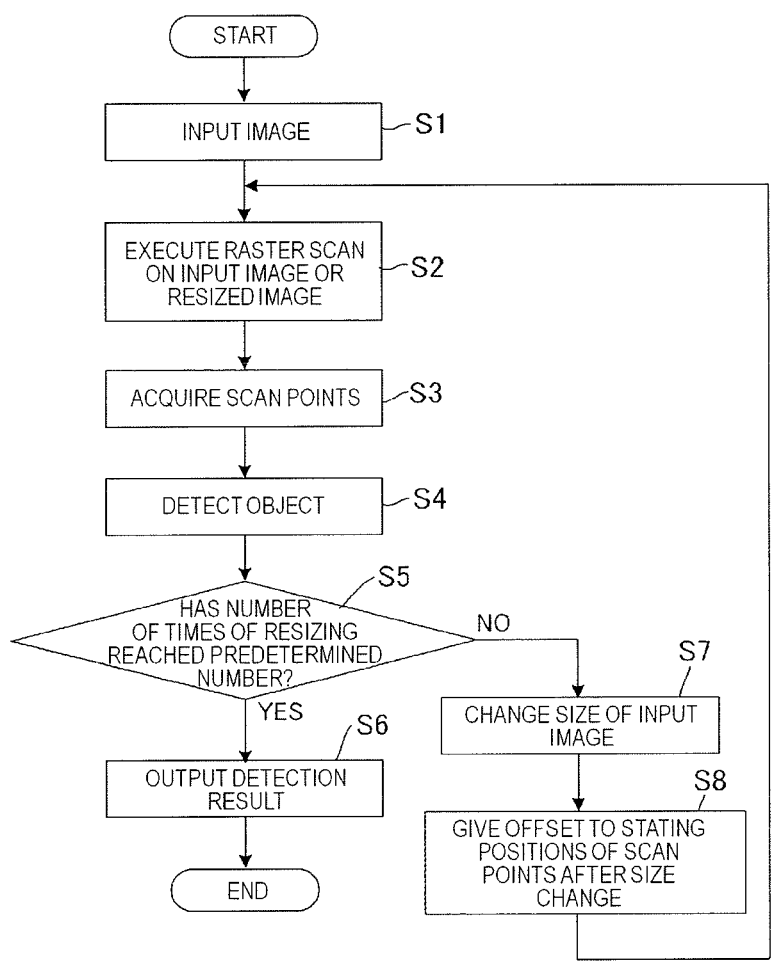
FIG. 7 is a flow chart illustrating an operation of the object detection device of FIG. 1.

FIG. 7 is a flow chart illustrating an operation of the object detection device 1 according to this embodiment. In FIG. 7, first, the image input unit 2 inputs an image (step S1). Subsequently, the raster scan execution unit 3 executes a raster scan on an input image or a resized image with respect to the image which is input (step S2). In this case, with respect to an initial image which is not resized, the raster scan is performed on the input image corresponding to the initial image. During the execution of the raster scan, the scan point acquisition unit 4 acquires scan points (step S3), and the detection unit 7 further performs object detection (step S4). After the object detection is performed on the input image or the resized image, it is determined whether the number of times of resizing has reached a predetermined number (step S5). When the number of times of resizing has reached the predetermined number (that is, when it is determined to be "Yes" in the determination of step S5), detection results are output (step S6). After the detection results are output, this process is terminated.

On the other hand, in the determination of step S5 described above, when it is determined that the number of times of resizing has not reached the predetermined number (that is, when it is determined to be "No" in the determination of step S5), the size-changing unit 5 changes the size of the input image (step S7). Subsequently, the offset unit 6 gives an offset to starting positions of the scan points after the size is changed (step S8), and the process returns to step S2. When the process of step S8 transitions to the process of step S2, a raster scan is executed on the resized image.

In this manner, the object detection device 1 according to this embodiment includes the image input unit 2 that inputs an image, the raster scan execution unit 3 that executes a raster scan on the input image using a scan window in order to detect an object within the input image which is input by the image input unit 2, the scan point acquisition unit 4 that acquires scan points of the scan window which are positions on the input image during the execution of the raster scan, and the size-changing unit 5 that changes the relative size of the input image with respect to the scan window. When the relative size is changed by the size-changing unit 5, an offset is given to the starting positions of the scan points after the change with respect to the starting positions of the scan points before the change, and it is possible to reduce the number of regions having sparse scan points in the entire input image and to suppress the degradation of object detection accuracy in the entire region of the input image. That is, it is possible to suppress the degradation of the degree of accuracy at which an object is detected, in spite of a repetitive reduction process being performed on the input image.

(Second Embodiment)

Figure 8:
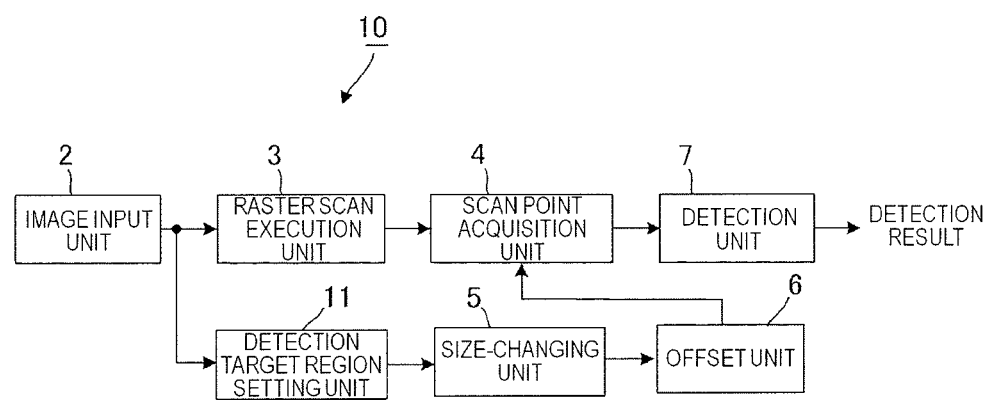
FIG. 8 is a block diagram showing a schematic configuration of an object detection device according to a second embodiment of the present invention.

FIG. 8 is a block diagram showing a schematic configuration of an object detection device according to a second embodiment of the present invention. In FIG. 8, an object detection device 10 according to the second embodiment adopts a configuration in which a detection target region setting unit 11 is added to the object detection device 1 according to the first embodiment described above. Meanwhile, portions in common with those of FIG. 1 are denoted by the same reference numerals and signs.

The detection target region setting unit 11 sets a detection target region in which an object to be detected is included in an input image. The detection target region setting unit 11 is provided, and thus when the sum of distances and the sum of densities are obtained, a density of each of the scan points after the change, which are included in the detection target region, and a distance of each of the scan points after the change to the scan point before the change which is present in the vicinity of each of the scan points after the change are obtained for each of the scan points after the change. Although the object detection device 1 according to the first embodiment described above performs an offset control on the entire input image, the object detection accuracy is increased as a whole. However, when seen in smaller regions, there are regions in which object detection accuracy is improved and regions in which object detection accuracy is degraded. The object detection device 10 according to the second embodiment is configured such that a detection target region is set and a region having sparse scan points is minimized only with respect to the region.

Figure 9:
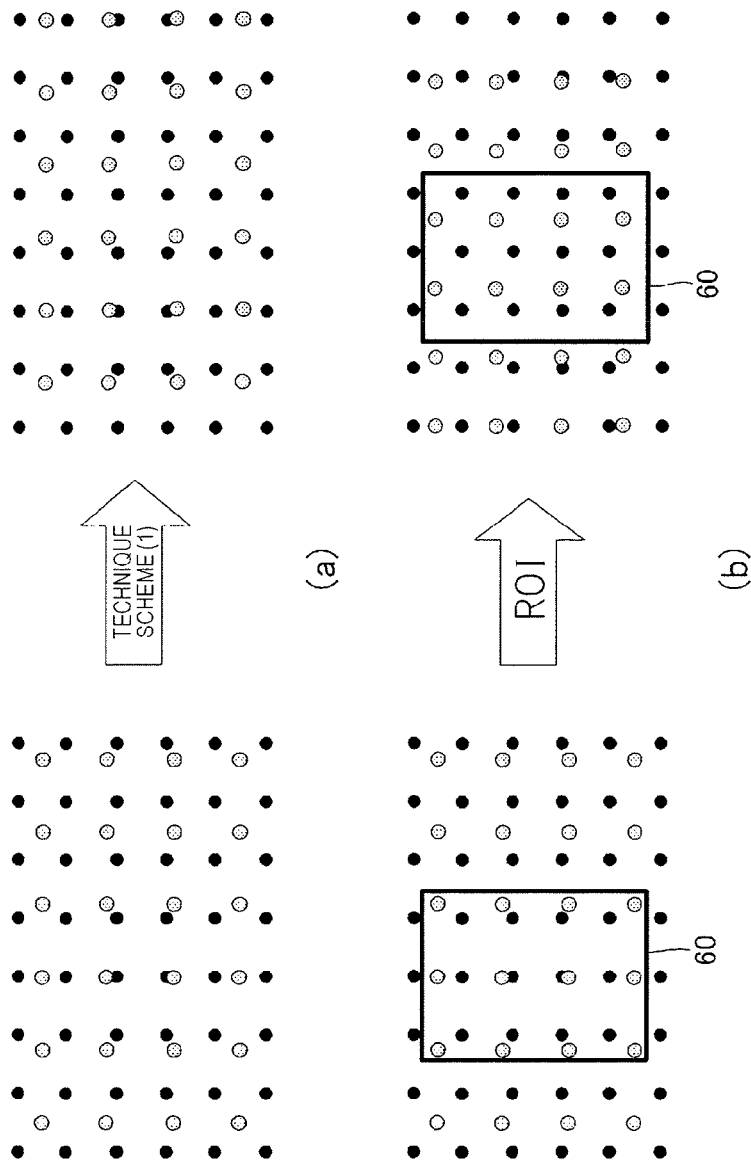
In FIG. 9, (a) and (b) are diagrams showing comparison between a technique of the object detection device of FIG. 1 and a technique of the object detection device of FIG. 8.

FIGS. 9(a) and 9(b) are diagrams showing comparison between a technique of the object detection device 1 according to the first embodiment and a technique of the object detection device 10 according to the second embodiment. FIG. 9(a) shows the former technique (technique scheme (1)), and FIG. 9(b) shows the latter technique. In the former technique, a region having sparse scan points is minimized in the entire input image, but the regions having sparse scan points still remain in spite of their low proportion. In the latter technique, a detection target region (ROI: region of interest) 60 is set, and an offset control is performed so as to minimize only the number of regions having sparse scan points within the detection target region 60. Meanwhile, as a method of determining the detection target region, various methods are considered such as an input using a user graphical user interface (GUI) or the use of motion information of an object and various sensing device information.

When the sum of distances and the sum of densities are obtained, the offset unit 6 obtains a density of each of the scan points after the change which are included in the detection target region 60 set by the detection target region setting unit 11 and a distance of each of the scan points after the change to the scan point before the change which is present in the vicinity of each of the scan points after the change, for each of the scan points after the change. The distance and the density are obtained for each of the scan points after the change, and an offset is given to the starting positions of the scan points after the change with respect to the starting positions of the scan points before the change so that the sum of the distances is larger and the sum of the densities is smaller.

In this manner, the object detection device 10 according to this embodiment includes the detection target region setting unit 11 that sets the detection target region 60 in which an object to be detected is included in an input image. Since the offset unit 6 gives an offset to starting positions of scan points for the detection target region 60 of the input image which is set by the detection target region setting unit 11, it is possible to reduce a region having sparse scan points in the detection target region 60 and to suppress the degradation of the object detection accuracy in the detection target region 60.

(Third Embodiment)

Figure 10:
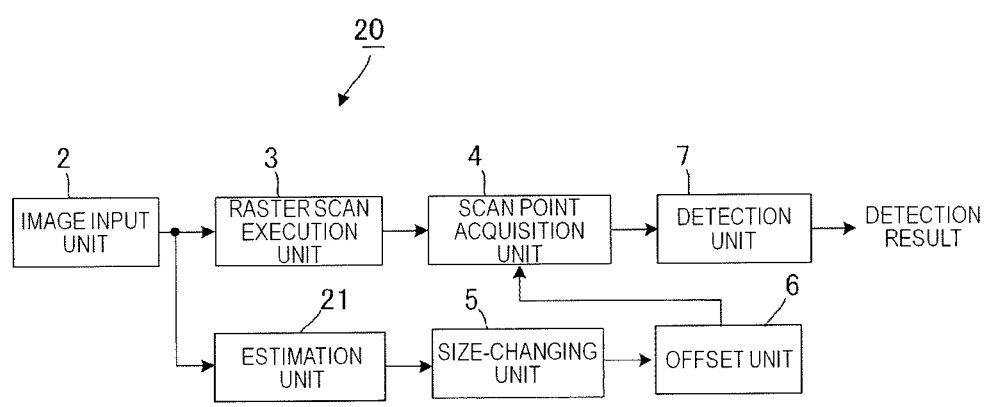
FIG. 10 is a block diagram showing a schematic configuration of an object detection device according to a third embodiment of the present invention.

FIG. 10 is a block diagram showing a schematic configuration of an object detection device according to a third embodiment of the present invention. In FIG. 10, an object detection device 20 according to the third embodiment adopts a configuration in which an estimation unit 21 is added to the object detection device 1 according to the first embodiment described above. Meanwhile, portions in common with those of FIG. 1 are denoted by the same reference numerals and signs.

The estimation unit 21 is technically close to the detection target region setting unit 11 included in the object detection device 10 according to the second embodiment described above, and estimates the size of an object based on the position of the object included in an input image. For example, when the object is a person, the estimation unit estimates the height of the person. In addition, the estimation unit estimates heights of all persons shown in the entire region of the input image.

When the input image is divided into partial regions, a size-changing unit 5 changes the size of the partial region in accordance with the size of the object which is estimated by the estimation unit 21 to change the relative size thereof. The offset unit 6 obtains the sum of distances and the sum of densities for each of scan points included in the partial region obtained by the size-changing unit 5. In addition, when the sum of distances and the sum of densities are obtained, the offset unit 6 obtains a density of each of the scan points after the change, which are included in the partial region, and a distance of each of the scan points after the change to the scan point before the change which is present in the vicinity of each of the scan points after the change, for each of the scan points after the change. The distance and the density are obtained for each of the scan points after the change, and an offset is given to the starting positions of the scan points after the change with respect to the starting positions of the scan points before the change so that the sum of the distances is larger and the sum of the densities is smaller.

Figure 11:
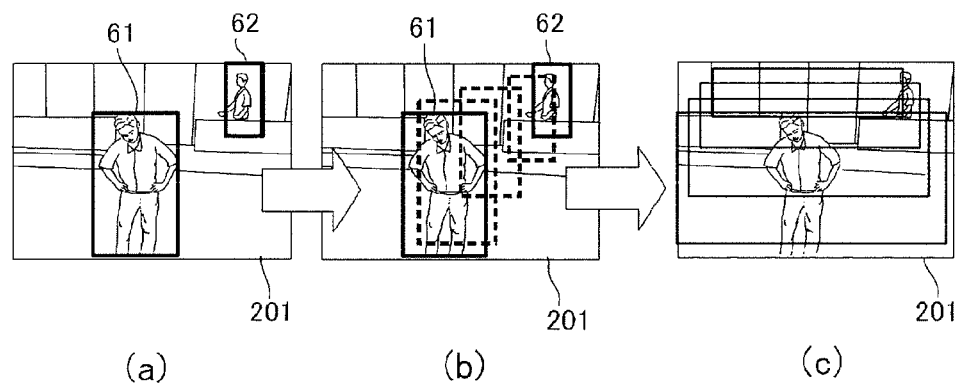
In FIG. 11, (a) to (c) are diagrams showing a height estimation process in the object detection device of FIG. 10.

FIGS. 11(*a*) to 11(*c*) are diagrams showing a height estimation process in the object detection device 20 according to the third embodiment. As shown in FIG. 11(*a*), rectangles 61 and 62 of the biggest person and the smallest person shown in an input image 201 are manually input on a user GUI (this method is not limited to the manual input, and methods using motion information of a person and various sensing device information may be used). Subsequently, as shown in FIGS. 11(*b*) and 11(*c*), heights of the persons shown in the entire region within the input image 201 are estimated (the present invention is not limited to this method, and for example, linear interpolation between the rectangles of the smallest and biggest persons may be performed). The size of a scan window is fixed, and the heights of the persons (sizes of objects) which are shown in the entire region within the input image 201 become known. Accordingly, it is possible to automatically set a region of a resized image on which a raster scan is to be performed, for each resized image of the input image 201.

FIGS. 12(*a*) and 12(*b*) are diagrams showing an example of an offset initial position and an example in which an offset position is shifted, in the object detection device 20 according to the third embodiment. In FIG. 12(*a*), the offset initial position is determined using results of the height estimation process. Subsequently, as shown in FIG. 12(*b*), the offset position is shifted so as to minimize the number of regions having sparse scan points.

Figure 13:
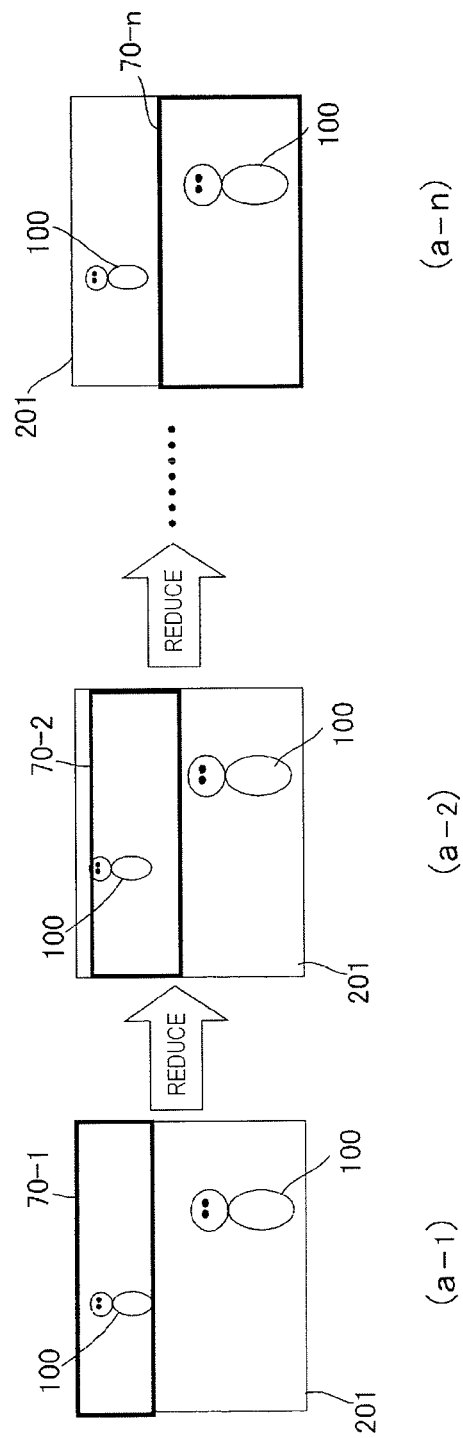
FIGS. 13 (a-1), (a-2) and (a-n) are diagrams showing an image reduction process in the object detection device of FIG. 10.
Figure 14:
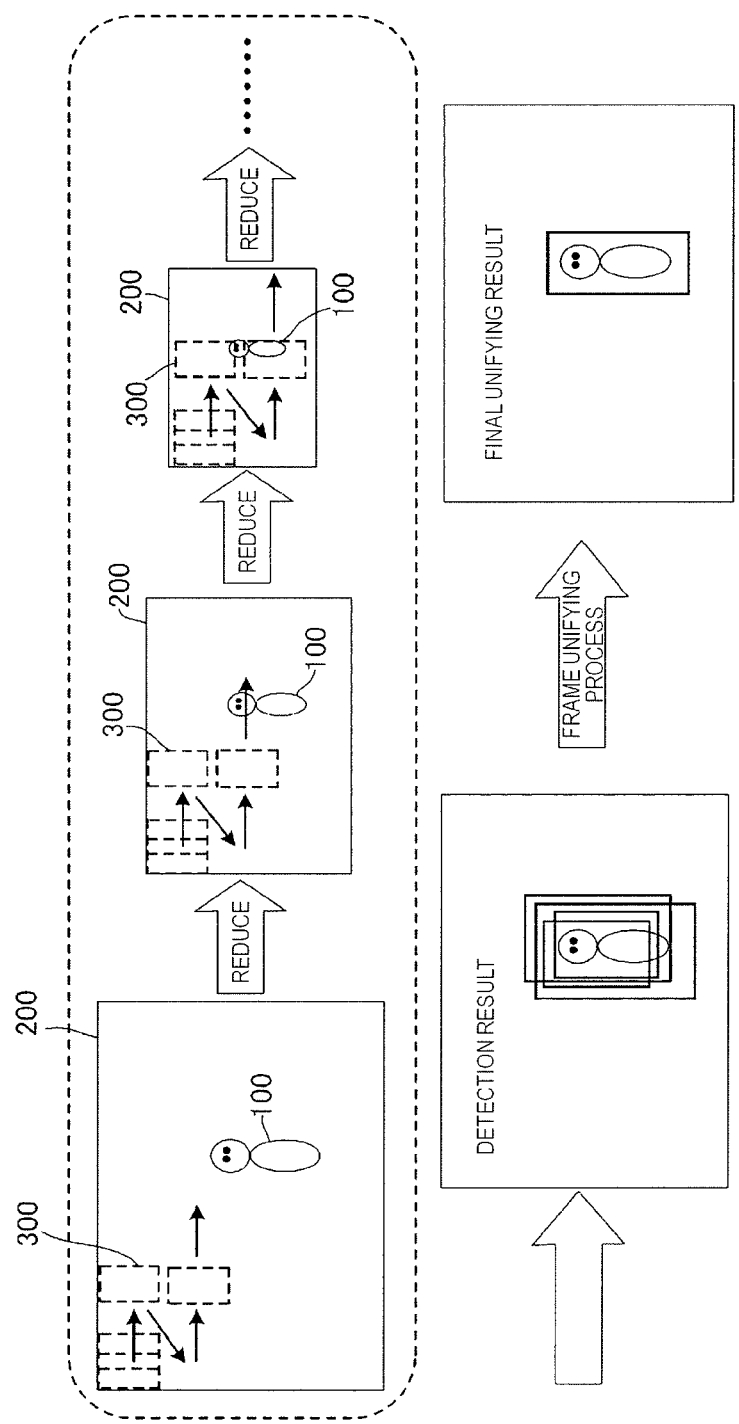
FIG. 14 is a schematic diagram showing an object detection process using a raster scan.

FIG. 13 is a diagram showing an image reduction process in the object detection device 20 according to the third embodiment. An image is reduced in the order of (a-1)->(a-2)-> . . . (a-n). From the results of the height estimation process, it can be seen at which position a large person is shown within the input image 201, and thus each of raster scan areas (partial regions) 70-1, 70-2, . . . 70-*n* is automatically set for each resized image. The raster scan area 70-1 shown in FIG. 13(*a*-1) is a raster scan area in a case of a resized image ID=0, the raster scan area 70-2 shown in FIG. 13(*a*-2) is a raster scan area in a case of a resized image ID=1, and the raster scan area 70-*n* shown in FIG. 13(*a*-*n*) is a raster scan area in a case of a resized image ID=i_MAX.

In this manner, the object detection device 20 according to this embodiment includes the estimation unit 21 that estimates the size of an object based on the position of the object included in an input image. When the input image is divided into partial regions, the size-changing unit 5 changes the size of the partial region in accordance with the size of the object to change the relative size thereof. In addition, since the offset unit 6 gives an offset to starting positions of scan points with respect to the partial regions, it is possible to reduce a region having sparse scan points in the partial region. Thus, it is possible to suppress the degradation of object detection accuracy in the partial region.

Meanwhile, it is also possible to store a program describing the functions of the object detection devices 1, 10, and 20 according to the above-described embodiments in a storage medium such as a magnetic disk, a hard disk, an optical disc, or a semiconductor memory and to distribute the program.

Meanwhile, in the first to third embodiments of the present invention, it is also possible to estimate in advance the size of an object included in an input image, to store an offset of a starting position of a scan point which is calculated in accordance with the estimated size of the object, and to use the stored starting position of the scan point when detecting the object.

(Fourth Embodiment)

Figure 17:
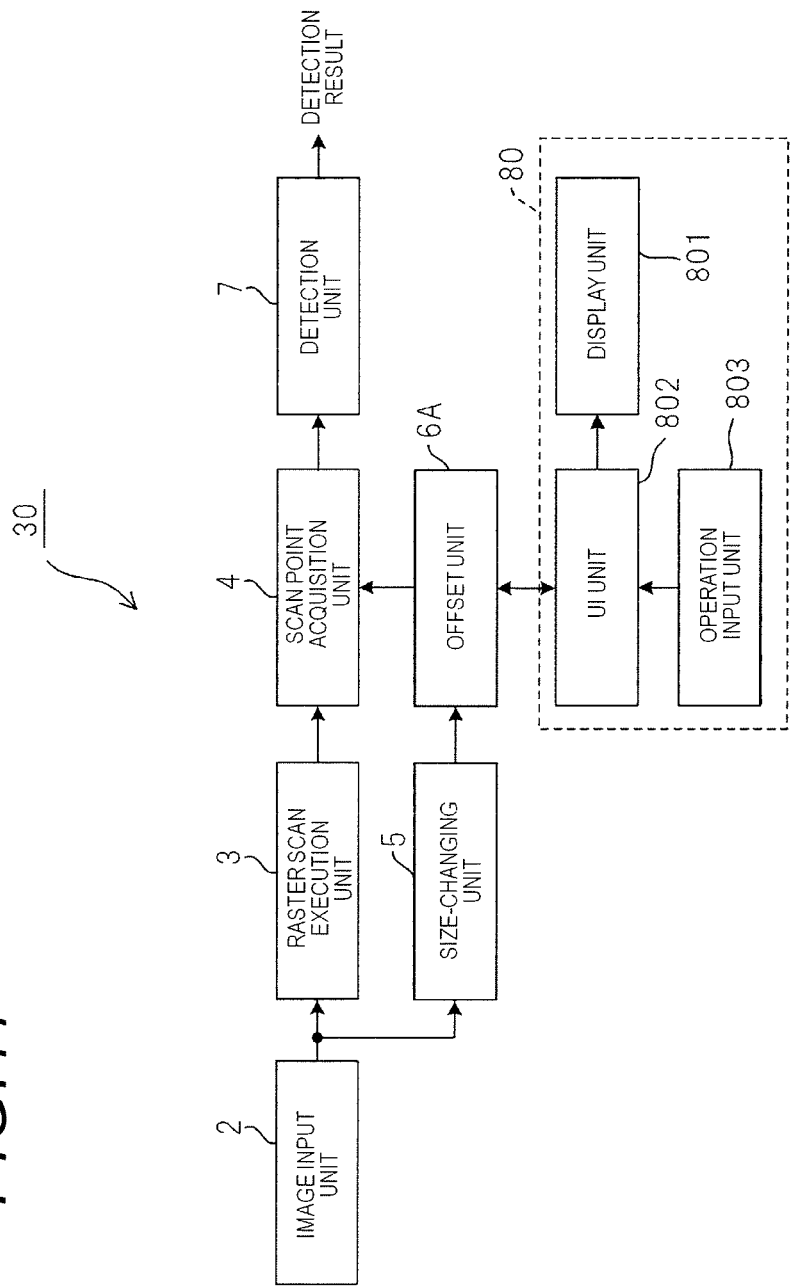
FIG. 17 is a block diagram showing a schematic configuration of an object detection device according to a fourth embodiment of the present invention.

FIG. 17 is a block diagram showing a schematic configuration of an object detection device according to a fourth embodiment of the present invention. Meanwhile, in FIG. 17, portions in common with those of FIG. 1 are denoted by the same reference numerals and signs. An object detection device 30 according to this embodiment includes an image input unit (image input means) 2 that inputs an image, a raster scan execution unit (raster scan execution means) 3 that executes a raster scan on the input image using a scan window in order to detect an object of the input image which is input by the image input unit 2 within the scan window, a scan point acquisition unit (scan point acquisition means) 4 that acquires scan points of the scan window which are positions on the input image during the execution of the raster scan, a size-changing unit (size-changing means) 5 that changes the relative size of the input image with respect to the scan window, an offset unit (output means) 6A that outputs the input image and a scan area on which the raster scan is performed to the outside, and a detection unit 7 that detects an object (for example, a person, a car, a bike, and the like) which is included in the input image and outputs the result thereof.

When the relative size of the input image is changed by the size-changing unit 5, the offset unit 6A gives an offset to starting positions of the scan points after the change with respect to starting positions of the scan points before the change so that positional relationships between the scan points before the change and the scan points after the change are distributed (separated from each other). That is, an offset is given to the starting positions of the scan points in each resized image so that the scan point positions in each resized image do not overlap each other as much as possible (so that the number of regions having sparse scan points is minimized). In addition, when search range information (rectangle information such as coordinates information) indicating a raster scan area designated by a user is given from a general-purpose personal computer (so-called PC) 80 to be described later, the offset unit 6A calculates an offset with respect to the raster scan area designated by the user so that the number of regions having sparse scan points is minimized. The offset unit 6A gives the calculated offset to the starting positions of the scan points. In addition, the offset unit 6A outputs the offset information, the input image, and the raster scan area to the general-purpose PC 80.

Figure 18:
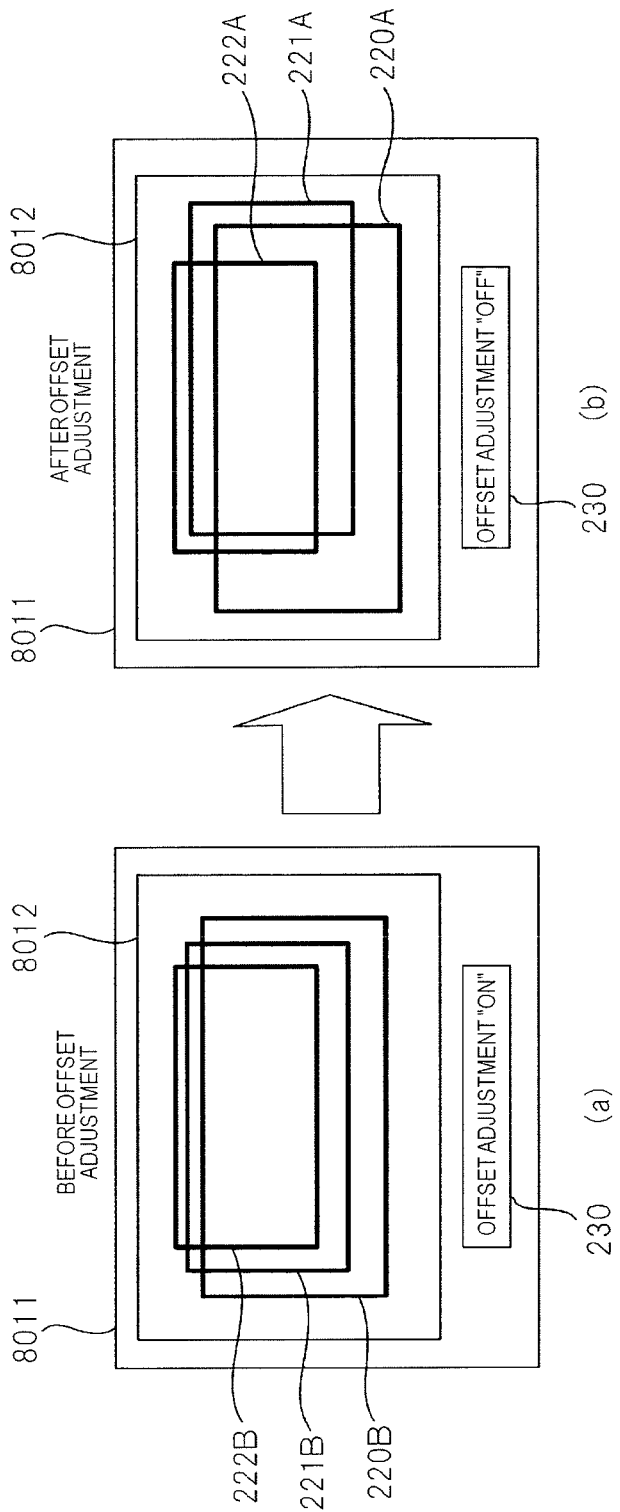
In FIG. 18, (a) and (b) are diagrams showing a display example of raster scan areas, which are drawn on a monitor screen of a display unit of a general-purpose PC connected to the object detection device of FIG. 17, and an offset adjustment button.

The general-purpose PC 80 includes a display unit 801 that includes a display such as a liquid crystal display or an organic EL display, a user interface (UI) unit 802 that draws a raster scan area, a scan point, an offset adjustment button, and the like on a screen (hereinafter, referred to as a "monitor screen") of the display unit 801, and an operation input unit 803 that inputs a user's operation. FIGS. 18(*a*) and 18(*b*) show a display example of raster scan areas, which are drawn on a monitor screen 8011 of the display unit 801, and an offset adjustment button. FIG. 18(*a*) shows raster scan areas 220B to 222B (B refers to "Before") before offset adjustment is performed, and FIG. 18(*b*) shows raster scan areas 220A to 222A (A refers to "After") after offset adjustment is performed. The raster scan areas 220B to 222B and the raster scan areas 220A to 222A are displayed within a raster scan area drawing screen 8012 of the monitor screen 8011, and the offset adjustment button 230 is displayed immediately below the raster scan area drawing screen 8012.

Before the offset adjustment is performed, the offset adjustment button 230 is displayed as "offset adjustment ON". In this state, the offset adjustment button 230 is pressed to perform the offset adjustment on the raster scan areas 220B to 222B, and thus the raster scan areas 220A to 222A are displayed. At the same time, the offset adjustment button 230 is displayed as "offset adjustment OFF". After the offset adjustment is performed, the offset adjustment button 230 is pressed again to display the raster scan areas 220B to 222B before the offset adjustment, and the offset adjustment button 230 is displayed as "offset adjustment ON". In this manner, whenever the offset adjustment button 230 is pressed, the raster scan areas 220B to 222B before the offset adjustment and the raster scan areas 220A to 222A after the offset adjustment are alternately displayed, and the offset adjustment button 230 being displayed as "offset adjustment ON" and the offset adjustment button being displayed as "offset adjustment OFF" are alternately switched between. The raster scan areas before and after the offset adjustment are displayed, and thus it is possible to visually confirm a state where the positions of the raster scan areas are shifted on the monitor screen 8011.

Alternatively, instead of displaying only the raster scan areas, only the scan points may be displayed, or the raster scan areas and the scan points may be simultaneously displayed. When the scan points are displayed, the scan points are configured to be output from the offset unit 6A. The UI unit 802 of the general-purpose PC 80 acquires the scan points output from the offset unit 6A so as to display the scan points and the offset adjustment button on the monitor screen 8011.

Figure 19:
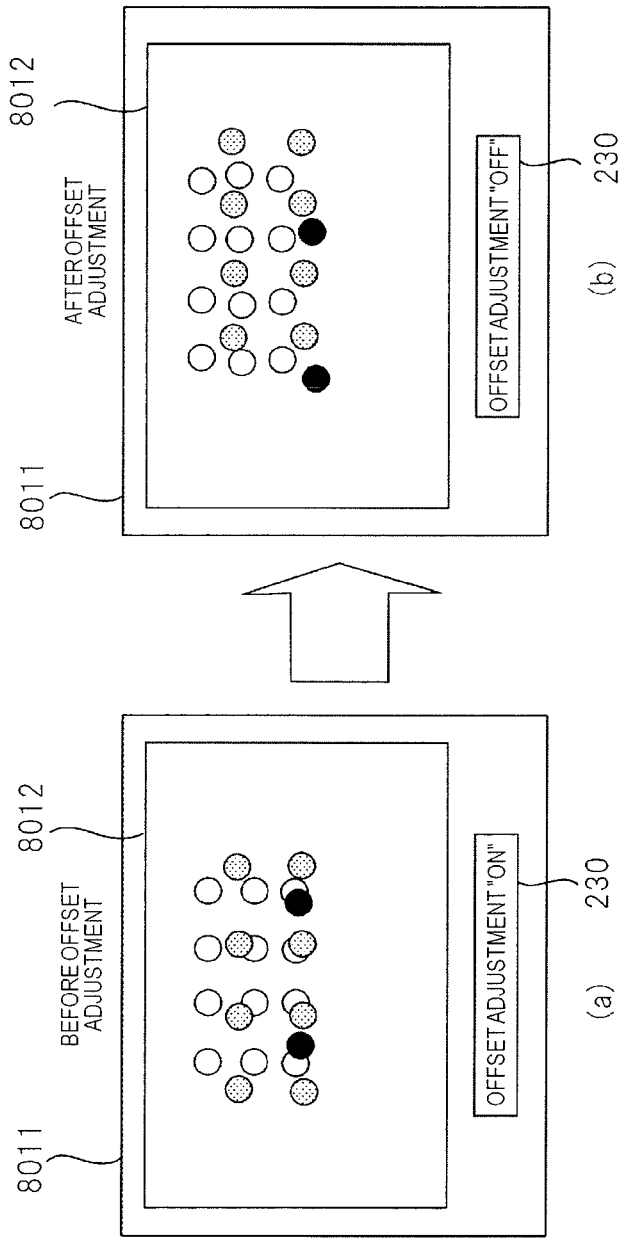
In FIG. 19, (a) and (b) are diagrams showing a display example of scan points, which are drawn on a monitor screen of a display unit of a general-purpose PC connected to the object detection device of FIG. 17, and an offset adjustment button.

FIGS. 19(*a*) and 19(*b*) show a display example of scan points, which are drawn on the monitor screen 8011 of the display unit 801, and an offset adjustment button. FIG. 19(*a*) shows scan points before offset adjustment is performed, and FIG. 19(*b*) shows scan points after offset adjustment is performed. Before the offset adjustment is performed, the offset adjustment button 230 is displayed as "offset adjustment ON". In this state, the offset adjustment button 230 is pressed to display the scan points on which the offset adjustment is performed. In addition, the offset adjustment button 230 is pressed, and thus the offset adjustment button 230 is displayed as "offset adjustment OFF".

When the offset adjustment button 230 is pressed after the offset adjustment is performed, the scan points before the offset adjustment are displayed, and the offset adjustment button 230 is displayed as "offset adjustment ON". In this manner, whenever the offset adjustment button 230 is pressed, the scan points before the offset adjustment and the scan points after the offset adjustment are alternately displayed, and the offset adjustment button 230 being displayed as "offset adjustment ON" and the offset adjustment button being displayed as "offset adjustment OFF" are alternately switched between. Before the offset adjustment is performed, regions having sparse scan points and regions having dense scan points are present. However, the scan points are distributed by performing the offset adjustment, and thus the number of regions having sparse scan points is reduced. The scan points before and after the offset adjustment are displayed, and thus it is possible to visually confirm a state where the scan points are distributed on the monitor screen 8011.

In this manner, according to the object detection device 30 of this embodiment, since at least an input image and scan areas are output to the external general-purpose PC 80, it is possible to visually confirm a state where the raster scan areas are shifted and a state where the scan points are distributed on the monitor screen 8011 of the general-purpose PC 80, thereby allowing an improvement in operability and an improvement in object detection efficiency to be achieved.

Meanwhile, the drawing of the raster scan areas and the scan points on the monitor screen 8011 is not necessarily required to be performed using the offset adjustment button 230 which is installed on the GUI as shown in FIGS. 18(*a*) and 18(*b*) and FIGS. 19(*a*) and 19(*b*), and may be performed using various methods such as, for example, a change in a parameter of a setting file (in short, various methods can be adopted, in addition to a method of operating the offset adjustment button 230).

(Fifth Embodiment)

Figure 20:
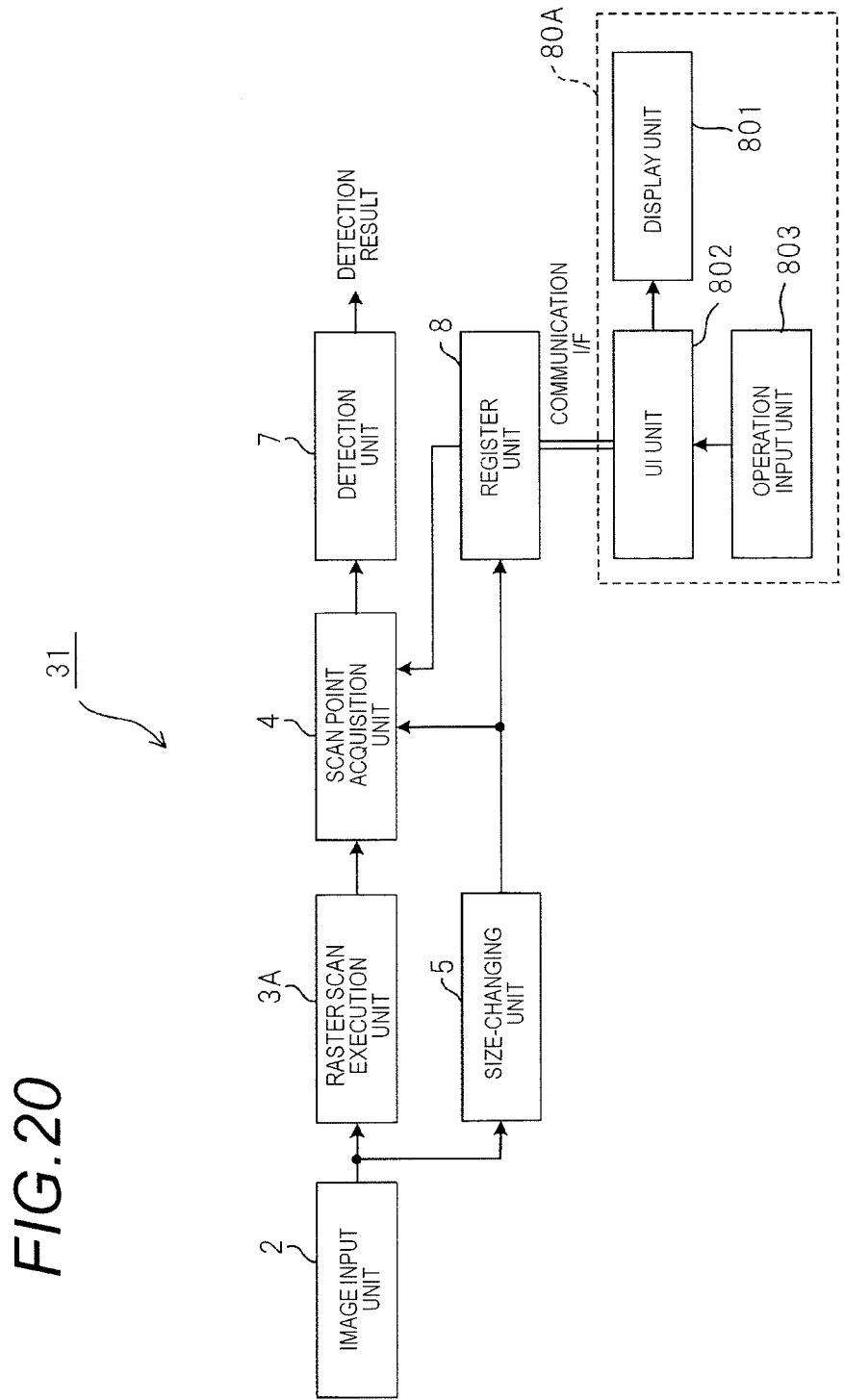
FIG. 20 is a block diagram showing a schematic configuration of an object detection device according to a fifth embodiment of the present invention.

FIG. 20 is a block diagram showing a schematic configuration of an object detection device according to a fifth embodiment of the present invention. Meanwhile, in FIG. 17, portions in common with those of FIG. 1 are denoted by the same reference numerals and signs. An object detection device 31 according to this embodiment includes an image input unit (image input means) 2 that inputs an image, a raster scan execution unit (object detection means) 3A that detects an object by performing a raster scan on a plurality of scan windows, for detecting the object from the input image which is input by the image input unit 2, on the image for each reduction ratio, on the image for each reduction ratio, a scan point acquisition unit 4 that acquires scan points of the scan window which are the positions on the input image using the raster scan execution unit 3A during the execution of the raster scan, a size-changing unit 5 that changes the relative size of the input image with respect to the scan window, a detection unit 7 that detects an object (for example, a person, a car, a bike, and the like) which is included in the input image and outputs the result thereof, and a register unit (scan point input means) 8 that inputs the reduction ratio when the raster scan of the scan window is performed and the scan point of the scan window on the image for each reduction ratio.

The object detection device 31 according to this embodiment is a device which is configured to supply an offset calculated outside to the register unit 8. The offset is calculated by an external general-purpose PC 80A. The object detection device 31 according to this embodiment is configured to generate rectangle information of a raster scan area in a reduction ratio and to supply the information to the register unit 8.

Figure 21:
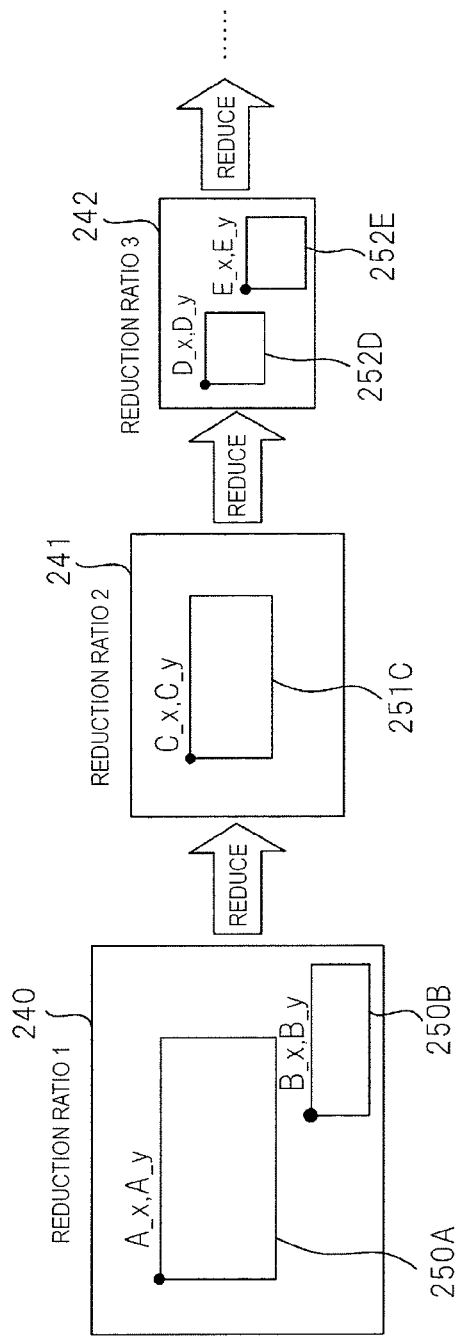
FIG. 21 is a diagram showing reduction ratios of an image when a raster scan is performed on raster scan areas in the object detection device of FIG. 20, and starting positions of scan points of the raster scan areas on the image for each reduction ratio.

FIG. 21 is a diagram showing reduction ratios of an image when a raster scan is performed on raster scan areas, and starting positions of scan points of the raster scan areas on the image for each reduction ratio. Referring to FIG. 21, in an image 240 having a reduction ratio "1", the reduction ratio "1" and rectangle information of raster scan areas 250A and 250B in the reduction ratio "1" are supplied to the register unit 8. The rectangle information of the raster scan area 250A is (A_x, A_y, A_width, and A_height), and the rectangle information of the raster scan area 250B is (B_x, B_y, B_width, and B_height). Here, A_x, A_y is coordinates of a rectangle's upper left point of the raster scan area 250A, and is the starting position of the scan point. In addition, B_x, B_y is coordinates of a rectangle's upper left point of the raster scan area 250B, and is the starting position of the scan point. In each of the raster scan areas 250A and 250B, the coordinates of the rectangle's upper left point include an offset.

Next, in an image 241 having a reduction ratio "2", the reduction ratio "2" and rectangle information of a raster scan area 251C in the reduction ratio "2" are supplied to the register unit 8. The rectangle information of the raster scan area 251C is (C_x, C_y, C_width, and C_height). Here, C_x, C_y is coordinates of a rectangle's upper left point, and is the starting position of the scan point. In the raster scan area 251C, the coordinates of the rectangle's upper left point include an offset.

Next, in an image 242 having a reduction ratio "3", the reduction ratio "3" and rectangle information of raster scan areas 252D and 252E in the reduction ratio "3" are supplied to the register unit 8. The rectangle information of the raster scan area 252D is (D_x, D_y, D_width, and D_height), and the rectangle information of the raster scan area 252E is (E_x, E_y, E_width, and E_height). Here, D_x, D_y is coordinates of a rectangle's upper left point of the raster scan area 252D, and is the starting position of the scan point. In addition, E_x, E_y is coordinates of a rectangle's upper left point of the raster scan area 252E, and is the starting position of the scan point. In each of the raster scan areas 252D and 252E, the coordinates of the rectangle's upper left point include an offset.

The scan points of the scan window which are supplied to the register unit 8 are distributed on the image, and thus a sparse area is reduced. That is, the sum of distances between the scan points of the scan window having different reduction ratios is set to be larger. The register unit 8 acquires reduction ratios and scan points for each reduction ratio from the external general-purpose PC 80A. Each of the general-purpose PC 80A and the register unit 8 of the object detection device 31 includes a communication interface (not shown) and a communication protocol which are capable of performing communication through a network such as the Internet. The register unit 8 acquires reduction ratios and scan points for each reduction ratio through the network. Meanwhile, the general-purpose PC 80A includes a display unit 801, a UI unit 802, and an operation input unit 803 which are the same as those of the general-purpose PC 80 described above, except for the communication interface not shown in the drawing.

In this manner, according to the object detection device 31 of this embodiment, it is possible to input reduction ratios of an image when a raster scan is performed on raster scan areas and scan points of a scan window on the image for each reduction ratio from the external general-purpose PC 80A, thereby allowing a reduction in time spent on the detection of an object and an improvement in object detection efficiency to be achieved.

Although the present invention has been described so far in detail with reference to a specific embodiment, it will be obvious to those skilled in the art that various changes and modifications may be made without departing from the spirit and the scope of the invention.

The present application is based on Japanese Patent Application No. 2012-048272 filed on Mar. 5, 2012, the contents of which are incorporated herein by reference.

INDUSTRIAL APPLICABILITY

The present invention has an effect of being capable of minimizing the degradation of detection accuracy in spite of a repetitive image reduction process, and can be applied to various camera apparatuses such as a surveillance camera apparatus or a car-mounted camera apparatus.

REFERENCE SIGNS LIST 1, 10, 20, 30, 31: Object detection device
2: Image input unit
3, 3A: Raster scan execution unit
4: Scan point acquisition unit
5: Size-changing unit
6, 6A: Offset unit
7: Detection unit
8: Register unit
11: detection target region setting unit
21: Estimation unit
50, 51: Starting position of scan point
55, 56, 57: Scan point position
60: detection target region
70-1, 70-2, 70-n: Partial region
80, 80A: General-purpose PC
801: Display unit
802: UI unit
803: Operation input unit

The invention claimed is:

1. An object detection device comprising:
an object detector configured to detect an object by performing a raster scan on a scan window for detecting the object from an image; and
a scan point determiner configured to determine an amount of offset to be added to positions of scan points of the scan window on the image based on a reduction ratio of the image,
wherein the amount of offset is determined so that aسum of distances between the scan points of the scan window on the image and scan points of a scan window used for another image which is different in a reduction ratio from the image is larger when the offset is added than without adding the offset.

2. The object detection device according to claim 1, further comprising an output that outputs the image and a scan area where the raster scan is executed in the image, to a display.

3. The object detection device according to claim 1, further comprising an output that outputs the image and the scan points in the image, to a display.

4. The object detection device according to claim 2, wherein the display is caused to display information for instructing whether or not to add the offset.

5. The object detection device according to claim 3, wherein the display is caused to display information for instructing whether or not to add the offset.

6. The object detection device according to claim 1, wherein the scan point determiner is further configured to determine the reduction ratio and the amount of offset from information acquired through a network.

7. An object detection method comprising:
   detecting an object by performing a raster scan on a scan window for detecting the object from an image; and
   determining an amount of offset to be added to positions of scan points of the scan window on the image based on a reduction ratio of the image,
   wherein the amount of offset is determined so that a sum of distances between the scan points of the scan window on the image and scan points of a scan window used for another image which is different in a reduction ratio from the image is larger when the offset is added than without adding the offset.

8. The object detection method according to claim 7, further comprising outputting the image and a scan area where the raster scan is executed in the image, to a display unit.

9. The object detection method according to claim 7, further comprising outputting the image and the scan points in the image, to a display unit.

10. The object detection method according to claim 8, further comprising causing the display unit to display information for instructing whether or not to add the offset.

11. The object detection method according to claim 9, further comprising causing the display unit to display information for instructing whether or not to add the offset.

12. The object detection method according to claim 7, wherein the reduction ratio and the amount of offset are determined from information acquired through a network.

* * * * *